Patented Aug. 2, 1932

1,870,212

UNITED STATES PATENT OFFICE

ALF LYSHOLM AND GÖSTA LUDVIG BERTIL WAHLSTEN, OF STOCKHOLM, SWEDEN, ASSIGNORS TO AKTIEBOLAGET LJUNGSTROMS ANGTURBIN, OF STOCKHOLM, SWEDEN, A JOINT STOCK COMPANY OF SWEDEN

CONDUCTING MEANS FOR STEAM IN RADIAL FLOW STEAM TURBINES

Application filed March 14, 1930, Serial No. 435,724, and in Germany March 20, 1929.

The present invention relates to radial flow elastic fluid turbines and has particular reference to turbines of this type in which labyrinth packing arrangements are employed between the turbine rotor or rotors and stationary parts of the turbine and in which stuffing boxes are employed between the turbine shaft or shafts and the stationary parts of the turbine surrounding the same.

In turbines of the above general character, a certain amount of leakage of motive fluid occurs at the stuffing boxes, which fluid has hitherto been disposed of in different ways, none of which, however, utilize to the desired extent the potential energy of the leakage fluid.

The general object of the present invention is to improve upon prior arrangements designed to take care of leakage fluid from stuffing boxes, so as to more efficiently utilize the potential energy of such fluid.

As will hereinafter be more fully explained, the above general object of the invention is secured by the provision of means for conducting the leakage fluid from the turbine stuffing boxes to the blade system of the turbine at a zone of relatively low pressure.

Further and more detailed objects of the invention and the manner in which they are carried into effect will be explained in connection with the following description of embodiments of the invention which by way of example are illustrated in the accompanying drawings.

Figure 1:
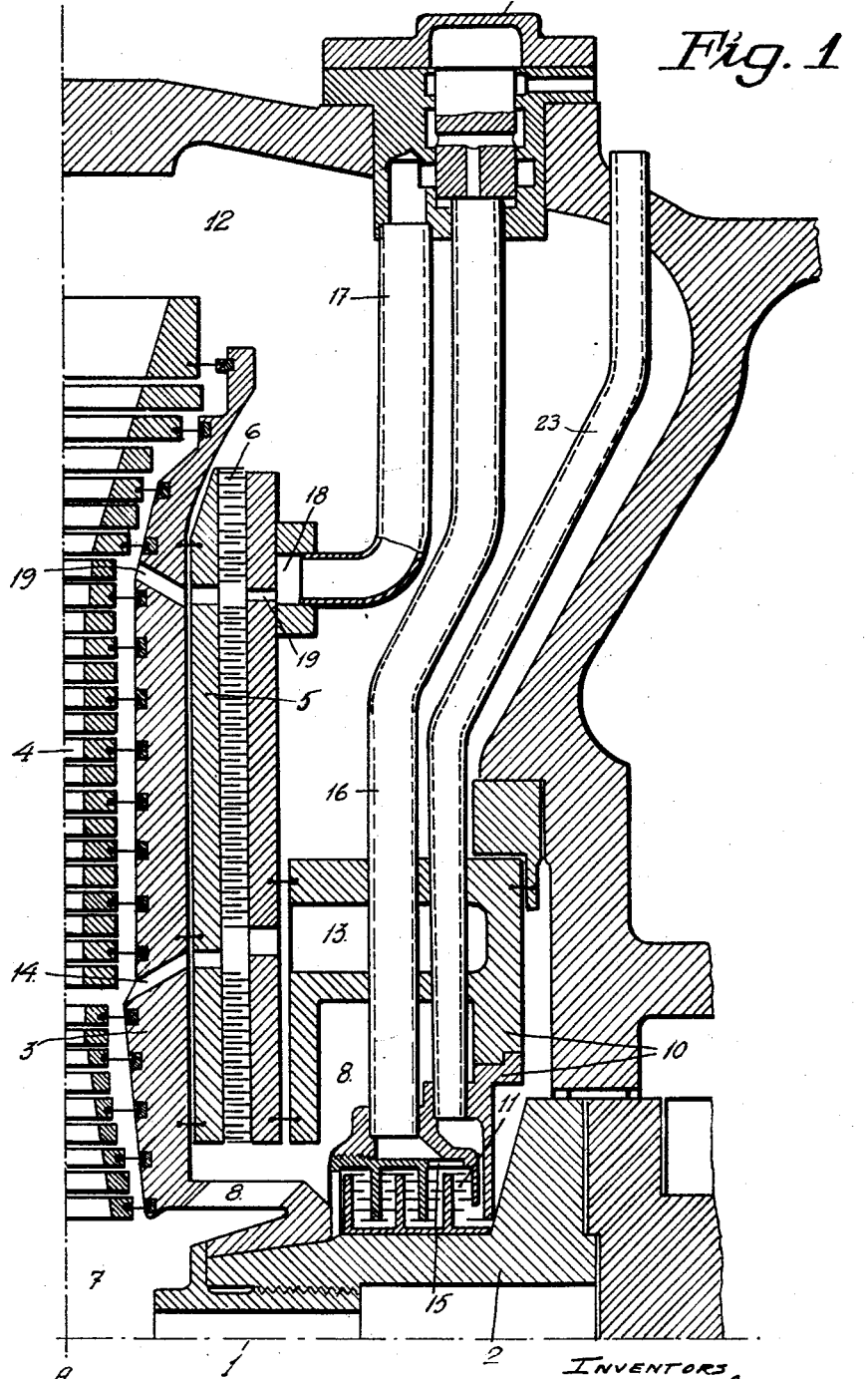
Fig. 1 shows a section through part of a steam turbine according to the invention.

Referring to Fig. 1, the line A—A designates a plane extending at right angles to the axis of rotation 1 of the turbine, in relation to which plane the turbine is symmetrical. The turbine disk 3 is in known manner united with the shaft 2. The turbine disk carries the blade system 4 and also carries the labyrinth disk 5. Between the labyrinth disk and the stationary parts of the turbine is arranged a labyrinth packing 6 which prevents the motive fluid (usually, live steam) entering the turbine center 7 through the channel system 8 from leaking out in radial direction. Between the rotor shaft 2 and the stationary parts 10 surrounding the same are arranged stuffing boxes 11, whereby the steam is prevented from leaking out in a direction parallel to the shaft. The live steam in the turbine center 7 thus passes through the blade system 4 to the outlet 12, dropping in pressure and temperature as it passes through the blade system. From the channel 13 steam of the same pressure as the live steam may be introduced through the channels 14, the labyrinth packing 6, the labyrinth disk 5 and the turbine disk 3 to the interior of the blade system for taking care of overloads on the turbine. In the stuffing boxes, which in known manner consist of a number of zigzag channels having contractions produced by tightening edges, a channel 15 is, according to the invention, in communication with the blade system of the turbine. A conduit 16 is connected with this channel and communicates with a valve device 30 which later on will be more fully described in connection with Fig. 3 and through which steam from the conduit 16 will be able to pass only if the pressure of this steam exceeds the pressure of the space surrounding the turbine housing. When this is the case, the steam from this valve device will be led through the conduit 17 to a chamber 18, from which the steam is led through a number of holes 19, through the labyrinth packing 6, the labyrinth disk 5 and the turbine disk 3 to the interior of the blade system. The steam passing through the labyrinth packing 6 at 19, where steam from the stuffing boxes enters is thus led wholly or in part to the blade system of the turbine. The place or stage at which this leakage steam is introduced to the blade system must under normal working conditions of the turbine contain steam of the same pressure or preferably of lower pressure than the pressure of the space surrounding the turbine housing. This place must further be situated in relation to the over-load conduit 14 in such a manner that the steam pressure at the place of introduction of the leakage steam coming from the stuffing boxes is lower than at the place of introduction of over-load steam. The leakage steam from the stuffing boxes is preferably introduced through holes 19 which are situated within the last third or the last fourth of the blade system, viewed in the direction of flow of the live steam. In like manner the conduit for the leakage steam should open into the blade system of the turbine at a place at which under normal working conditions of the turbine only one tenth or less, preferably only one thirtieth, of the drop of pressure still remains.

Figure 2:
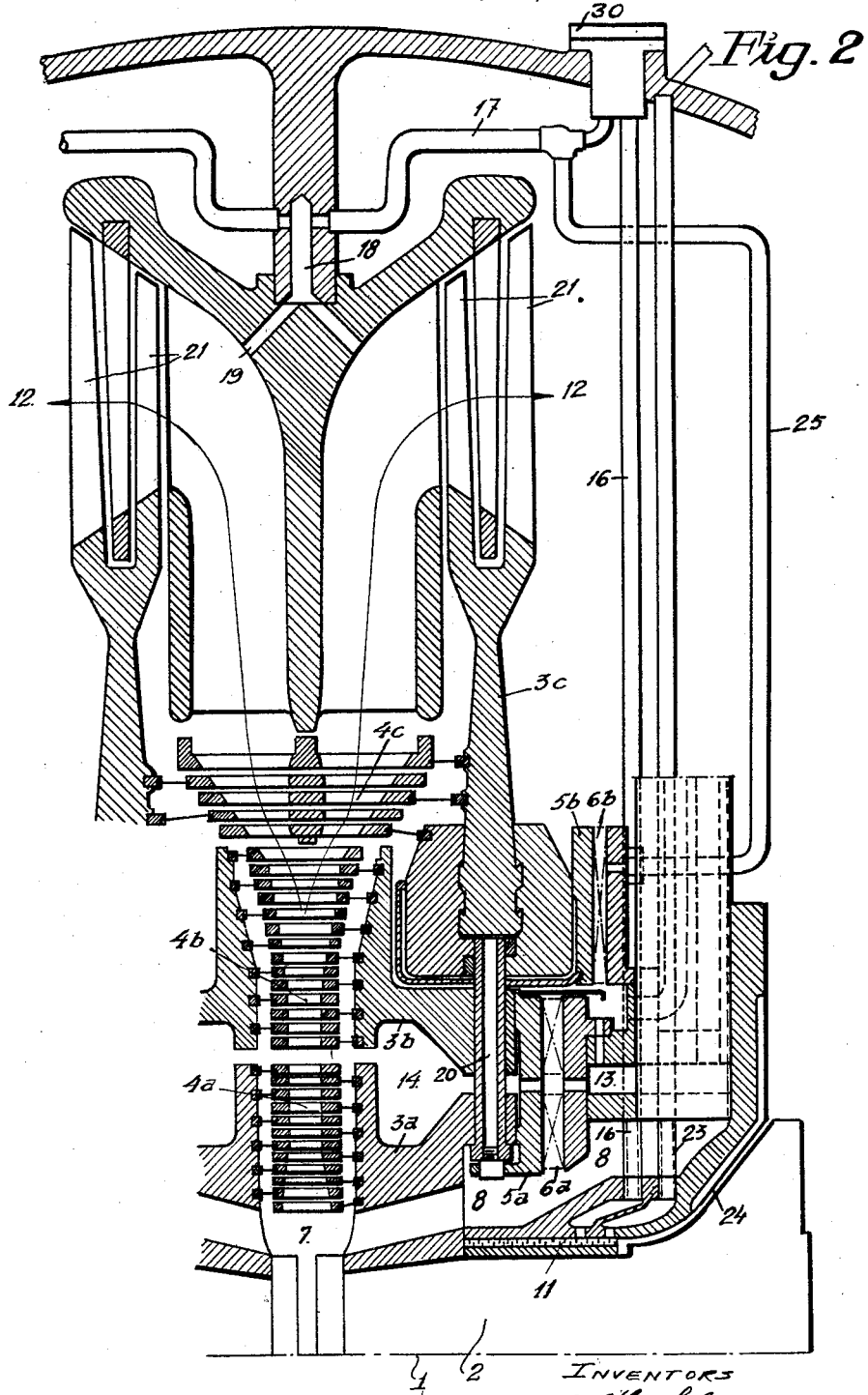
Fig. 2 shows a similar section through a turbine having an axial flow blade system and constructed in accordance with the invention.

Referring to Fig. 2, 1 is the axis of rotation of the turbine, 2 the turbine shaft, 3a, 3b and 3c those parts which together constitute the turbine disk. These parts are in a manner known per se united with each other by radial bolts 20 and carry the radial blade system 4a, 4b and 4c, while the external turbine disk 3c also carries the axial flow blade system 21. The external portion of the stuffing box 11 is in communication by means of a conduit 23 with the outside of the turbine, if desired through the intermediary of an ejector. Through the conduit 16, which through a suitable channel is in communication with the interior of the stuffing box 11, the leakage steam passes through the valve 30 and the conduit 17 to a number of channels 18 and 19, through which steam is introduced to the turbine at the space between the radial flow blade system and the axial flow blade system. The steam which is not led away through the conduit 16 and the conduit 23 from the stuffing boxes, passes through the channel 24 towards the space surrounding the turbine. From the labyrinth packing comprising the portions 6a and 6b the steam is led through a conduit 25 to the conduit 17, whereby this steam together with leakage steam from the stuffing boxes is led back to a place in the turbine blade system where the same pressure conditions are present that have been described in connection with Fig. 1.

Figure 3:
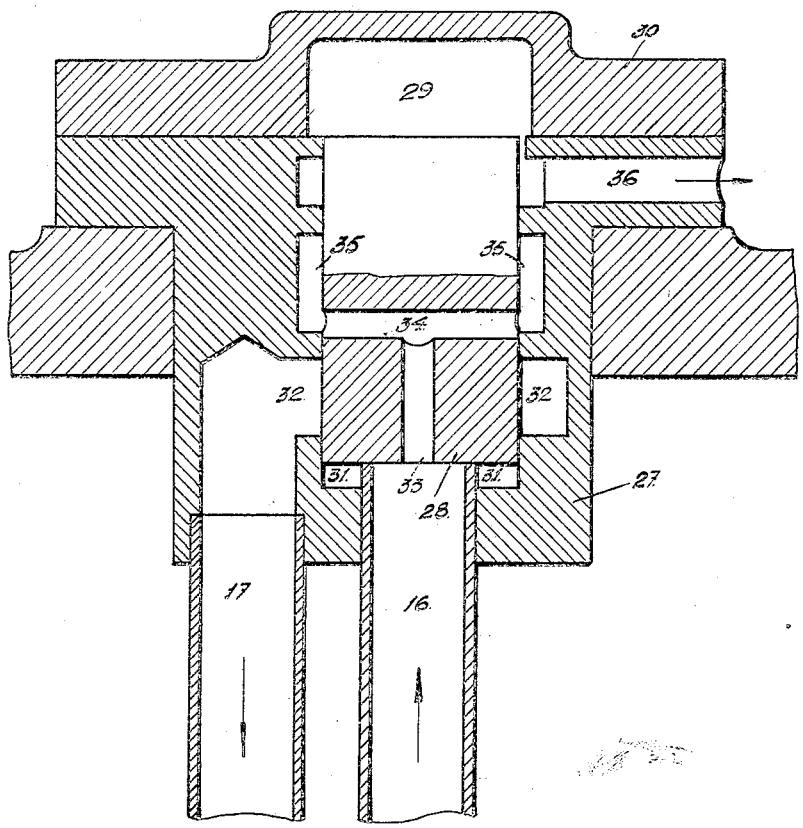
Fig. 3 shows a detail of an automatic valve, on a larger scale.

Fig. 3 shows the valve 30, in which the steam conduit 16 opens into a valve housing 27 under a piston 28. The space 29 above the piston is by means of a conduit 36 in communication with the space on the outside of the turbine. If the pressure on the outside of the turbine exceeds the steam pressure in the conduit 16, then the piston 28 occupies the position as shown in the drawing and thereby blocks the communication from the conduit 16 to the conduit 17 and thus also to the interior of the turbine. If on the other hand, the steam pressure in the conduit 16 exceeds the pressure surrounding the turbine, then the piston 28 will be lifted, so that steam from the space 31 underneath the piston 28 passes to the channel 32 and thus also to the conduit 17. In case the pressure in the conduit 16 is lower than the pressure surrounding the turbine and the piston thus occupies the position as shown, means are provided for preventing leakage of air to the conduit 17. In the embodiment illustrated, this means comprises channels 33 and 34 in piston 28 through which the steam from the conduit 16 may pass to the annular channel 35, whereby air is prevented from leaking around the walls of the piston into the space 32.

By means of apparatus according to the invention greater amounts of leakage steam may be led back to the blade system of the turbine, at the same time providing a guarantee for the steam not being mixed with air. The leakage conduit is independent of the over-load conduit, and for this reason the pressure in the labyrinth packing always corresponds to the pressure required for balancing purposes.

What we claim as new and desire to secure by Letters Patent of the United States of America is:—

1. In a radial flow elastic fluid turbine, a rotor comprising a labyrinth packing member and a shaft, a stationary labyrinth packing member cooperating with said first packing member to provide a labyrinth packing for the rotor extending in generally radial direction, a stuffing box for said shaft and conduit means including a plurality of apertures in said members for conducting elastic fluid leaking from said stuffing box and said labyrinth packing to said rotor at a stage normally operating at a pressure not exceeding substantially atmospheric pressure.

2. In a radial flow elastic fluid turbine, a rotor comprising a shaft and means adapted to cooperate with stationary means to provide a labyringth packing for the rotor ex tending in generally radial direction, a stuffing box for the shaft, means including a first series of apertures in said first named means for conducting over-load fluid to the blading of the rotor and conduit means for conducting leakage fluid from said stuffing box and said labyrinth packing to the blading of the rotor at a low pressure stage of the rotor, said conduit means including a second series of apertures in said first named means.

3. In a radial flow elastic fluid turbine, a rotor comprising a labyrinth packing member and a shaft, a stationary labyrinth packing member cooperating with said first packing member to provide labyrinth packing for the rotor extending in generally radial direction, a stuffing box for said shaft and conduit means for conducting elastic fluid leaking from said stuffing box and said labyrinth packing to said rotor at a stage normally operating at a pressure not exceeding substantially atmospheric pressure, said conduit means including an automatic valve adapted to pass leakage fluid from the stuffing box only at a pressure above atmospheric pressure.

4. In a radial flow elastic fluid turbine, a rotor having blading and a shaft, means providing a labyrinth packing for said rotor through which elastic fluid is adapted to flow in generally radial direction from a high pressure zone to a low pressure zone in the turbine, a stuffing box for said shaft and means for causing leakage fluid from said stuffing box to flow generally across the path of flow of fluid in said labyrinth packing to said blading at a low pressure zone therein.

5. In a radial flow elastic fluid turbine, a rotor having a shaft, means providing a labyrinth packing for said rotor through which elastic fluid is adapted to flow in generally radial direction from a high pressure zone to a low pressure zone in the turbine, a stuffing box for said shaft, channels providing communication at two different pressure zones between said labyrinth packing and the blading of said rotor, means including one of said channels for conducting over-load elastic fluid generally across the path of flow through said labyrinth packing to the blading of said rotor at the higher pressure zone and means including another of said channels for conducting elastic fluid leaking from said stuffing box generally across the path of flow through said packing to the blading of said rotor at the lower pressure zone.

ALF LYSHOLM.
GÖSTA LUDVIG BERTIL WAHLSTEN.